United States Patent [19]

Bonin et al.

[11] Patent Number: 4,694,687
[45] Date of Patent: Sep. 22, 1987

[54] VEHICLE PERFORMANCE ANALYZER

[75] Inventors: Wayne A. Bonin, Cedar; Roger D. McCumber, Minnetonka; Rein S. Teder, Minneapolis, all of Minn.

[73] Assignee: Vericom Corporation, Minnetonka, Minn.

[21] Appl. No.: 853,236

[22] Filed: Apr. 17, 1986

[51] Int. Cl.[4] ............................................. G01M 15/00
[52] U.S. Cl. ....................................... 73/116; 364/426
[58] Field of Search ................. 73/116, 517 R, 178 T; 364/426

[56] References Cited

U.S. PATENT DOCUMENTS

3,582,632 6/1971 Foster ............................. 364/424 X
4,627,011 12/1986 Spencer et al. ................. 364/426 X

*Primary Examiner*—Jerry W. Myracle
*Attorney, Agent, or Firm*—Orrin M. Haugen; Thomas J. Nikolai; Frederick W. Niebuhr

[57] ABSTRACT

A capacitive accelerometer system for detecting changes in G-forces and for producing a digital count value proportional to such changes. An oscillator-driven capacitive transducer of a unique design produces a voltage variation whose amplitude and frequency characteristics are a function of the direction and magnitude of the applied G-forces. The transducer itself comprises a pair of spaced-apart parallel plates disposed on opposite sides of a beam-supported movable plate which responds to changes in acceleration forces. The modulated signal is then demodulated and applied by a semiconductor switch actuated by a pulse from a microprocessor to a voltage-controlled current source. The current source varies the discharge rate of a precision capacitor. When the voltage on the capacitor drops to a predetermined threshold, an interrupt signal is presented to the microprocessor which had been counting one microsecond pulses from its internal clock during the period between the actuation of the semiconductor switch and the generation of the interrupt. The count is then inversely proportional to the shift in capacitance of the transducer which, in turn, is proportional to the G-forces applied to it.

8 Claims, 5 Drawing Figures

VEHICLE PERFORMANCE ANALYZER

BACKGROUND OF THE INVENTION

I. Field of the Invention

This invention relates generally to force-measuring apparatus, and more particularly to an accelerometer system particularly adapted for use in measuring the performance of a motorized vehicle, be it a land, water or air vehicle.

II. Discussion of the Prior Art

In assessing the performance of motor-driven vehicles, it is often desirable to know the capabilities of the vehicle in terms of acceleration and deceleration. For example, in the case of a high-performance automobile, it is often of interest to know how much time it takes for the vehicle to go from stand-still to, say, 60 MPH. In known prior art vehicle performance analyzers, it has been the common practice to couple a speedometer cable between the vehicle's drive shaft and the performance analyzer. This necessarily means that the performance analyzer is a rather permanent installation in the vehicle and it cannot be readily taken from one vehicle and used in another.

SUMMARY OF THE INVENTION

In accordance with the present invention, rather than deriving velocity and acceleration information from the angular velocity of the vehicle's drive shaft, via a speedometer-cable or electrical type of connection, the performance analyzer described herein utilizes a simple, inexpensive, yet rugged G-force sensor tied in with electronic circuitry, capable of producing a digital count value proportional to the vehicle's acceleration. Also included in this system is a programmed microprocessor which receives the digital value from the accelerometer circuitry and which is capable of integrating the above-mentioned digital count value to yield speed data and/or distance data to be presented on a display device. In that the electronic circuitry comprising the performance analyzer can be supplied with power from either a self-contained battery or from the vehicle's battery, it is readily portable and need not be dedicated to a single vehicle.

The transducer device comprises first and second pairs of G-force responsive, serially connected variable capacitors, which may be readily fabricated using conventional printed circuit etching techniques. More specifically, the transducer comprises a laminated, stacked configuration of five substrates. The two outer substrates have a metallized surface on each side thereof, the metal surface on the inner side comprising the first plates of a pair of variable capacitors. The two outer substrates each abut a generally rectangular frame having an open central portion, and sandwiched between these two frame members is the fifth substrate in the form of a planar metal mass which is suspended by four relatively thin, spring-like beams. The metal mass is displaceable within the frame openings when the assembly is subjected to acceleration forces, and it comprises a common second plate for the pair of variable capacitors. Electrical connections to the various layers in the laminated construction of the five substrates is conveniently established by conductive pins inserted through metallized holes made using conventional plated through hole techniques common to multi-layer printed circuit assemblies.

An alternating current signal from a high frequency oscillator is impressed across the terminals associated with the two stationary plates of the transducer and the central displaceable plates. As such, a push/pull signal, proportional to the amount of deflection of the central movable plate, is developed and subsequently amplified and then synchronously demodulated to produce a time-varying D.C. current signal. A switch device controlled by a signal originating in the microprocessor routes this signal to a comparator associated with a precision capacitor and current source to thereby alter its discharge time. When the voltage on the capacitor discharges through a fixed resistor to a predetermined threshold, an interrupt signal is generated and fed to the microprocessor. During the time interval of the discharge of the precision timing capacitor, the microprocessor's clock is used to feed regularly occuring signals to an internal counter such that at the time of generation of the interrupt signal, a digital value has been accumulated in the counter corresponding to the discharge time of the precision timing capacitor. This digital quantity is thus directly proportional to the G-forces experienced by the transducer element.

OBJECTS

It is accordingly a principal object of the present invention to provide an improved vehicle performance analyzer.

Another object of the invention is to provide a vehicle performance analyzer incorporating a transducer for producing signals proportional to the G-forces experienced by the vehicle.

Still another object of the invention is to provide an improved transducer construction for use in a performance analyzer.

Yet a further object of the invention is to provide an electronic circuit coupled to a capacitive transducer which converts changes in capacitance to a digital quantity, that quantity being proportional to acceleration and deceleration forces.

These and other objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
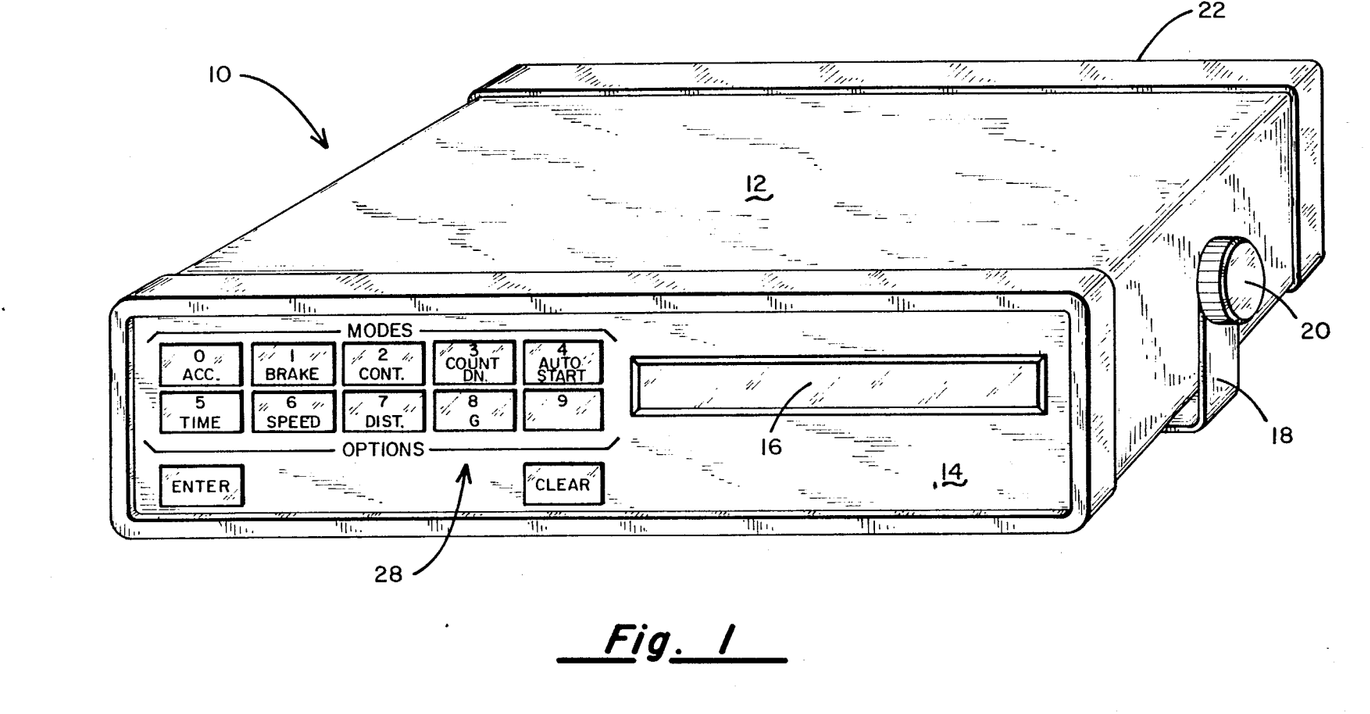
FIG. 1 is a perspective view of the preferred embodiment of a performance analyzer in accordance with the present invention.

Indicated generally by numeral 10 is the performance analyzer in accordance with the present invention. It is seen to include a box-like housing 12 having a front panel 14 containing a plurality of mode and option switches labeled with alpha and numeric designations.

These switches are manually operable push buttons and, as will be described in greater detail hereinbelow, comprises a keyboard for entries of operand and/or command into a microprocessor contained within the housing 12. Disposed alongside the twelve-digit keyboard is a display panel 16 on which results of various computations can be viewed by an operator.

Upon power-up, various internal registers are cleared to a predetermined state and a message is read from a ROM and displayed on the panel 16 instructing the user to select a desired mode e.g., monitor the acceleration, monitor deceleration (brake). The key labeled

2
CONT, when selected, will cause a continuous readout of the G-force being experienced by the vehicle on the display panel 16. The pushbuttons labeled "COUNT DN" and "AUTOSTART" can be considered as sub-groups for acceleration. When countdown is selected, the display will sequentially present the digits 5, 4, 3, 2, 1 and the word "RUNNING", in a time sequence, at which time the acceleration mode will begin registering. By selecting "AUTOSTART", it is possible to begin the timing of an acceleration run once the G-force has exceeded some threshold.

With the performance analyzer of the present invention, it is also possible by selecting appropriate "option" keys to record acceleration until a selected time, speed, distance or G-force has been reached. For example, in assessing vehicle performance, one may wish to know how long it takes for the vehicle to go from a first speed to a second speed, e.g., 0-60 MPH. In entering the numeric parameters, the "ENTER" key is used along with the numeric keys. Assuming it is desired to measure the time required to go from 0 MPH to 60 MPH, the user would select the SPEED option key and then press the "0" key, then the "ENTER" key, then the "6" key followed again by the "0" key, then the "ENTER" key.

The performance analyzer 10 may also be used to indicate the time taken for the vehicle to decelerate from a given speed to zero, as well as the distance traveled by the vehicle during that period. For example, the operator could press "Braking" while at a standstill and then accelerate to 55 MPH. The performance analyzer would register the start of the braking as soon as the operator hit the brake on the vehicle. Once the vehicle has stopped, it will provide a display of the time for the vehicle to come to that stop, the distance traveled during the interval between the application of the brake and the moment deceleration becomes zero, and the speed which the vehicle was going when the barke was applied.

It is important for proper operation of the performance analyzer of this invention that it be mounted in a level disposition within the vehicle. For this purpose, there is provided a U-shaped support stand 18 which straddles the underside of the housing 12 and which is secured thereto by thumb screws 20. Although not seen in the view of FIG. 1, on the rear panel 22 of the housing is an electrical jack which permits a connection to be made from an external power supply such as may be derived from the cigarette lighter socket of the vehicle in which the performance analyzer is used or from some other source of battery potential.

Having described the general mechanical configuration of the preferred embodiment, consideration will next be given to the details of the electrical circuitry used to implement the device in question. In this regard, reference is made to FIG. 2 of the drawings.

Figure 2:
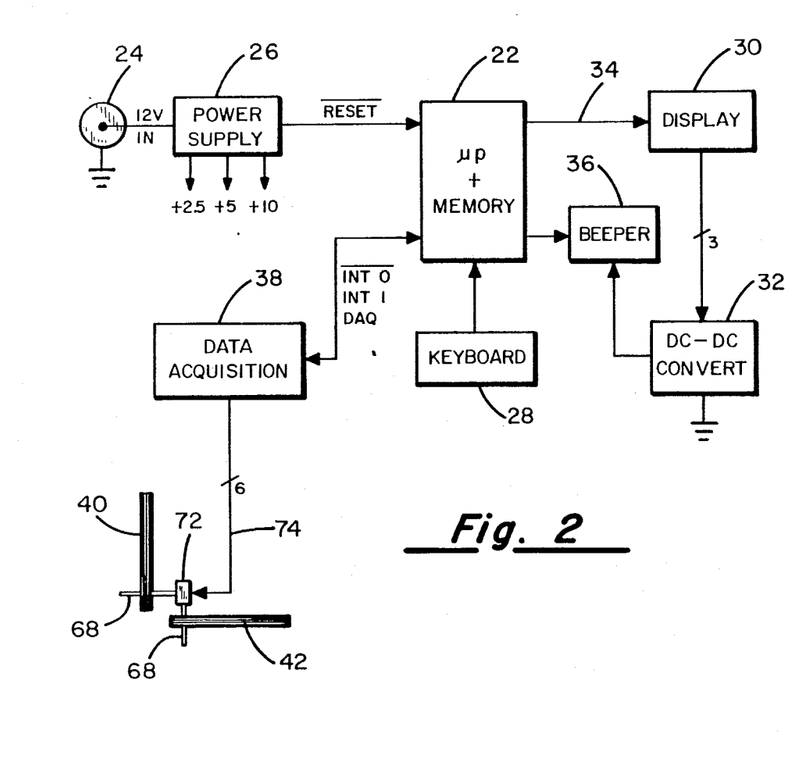
FIG. 2 is a block diagram of the circuitry used in the performance analyzer of FIG. 1.

In FIG. 2, there is shown a microprocessor chip 22 which, for example, may be an Intel 8031 microprocessor. As such, the chip requires 8K of external memory for storing the necessary program of instructions, operands and partial and final results of computation. As mentioned, power for the microprocessor and for the other modules used in the system may be derived from the vehicle's 12 volt battery supply, via a suitable jack 24, which is coupled to a regulated power supply 26, the power supply being arranged to provide the various voltages required by the microprocessor and other electronic devices.

As is shown in FIG. 2, the power supply provides a RESET input to the microprocessor for initializing the various registers contained within the microprocessor upon power-up to ready the system to receive operator inputs from the twelve-digit keyboard 28. The display device 30, which is arranged to present alpha/numeric data to the operator via display panel 16 (FIG. 1), is supplied with power from a D.C.-to-D.C. converter 32 and is tied to the appropriate outputs of the microprocessor 22 by way of data lines 34. With no limitation intended, the display device 30 may comprise a Type FIP 1GA5R display tube manufactured by NEC and coupled to the microprocessor 22 by way of Type SN-75518 display driver manufactured and sold by Texas Instruments of Dallas, Tex.

In addition to the visual display provided by the device 30, the performance analyzer also includes an audio signal or beeper device 36 which, too, receives its energization from the D.C.-to-D.C. converter 32 and is controlled by an output from the microprocessor 22.

The portion of the system already described in conjunction with FIG. 2 can be considered to be a combination of commercially-available devices and components. Unique to the implementation, however, is the data acquisition module 38 and the associated force sensitive transducers 40 and 42. It is the function of the data acquisition unit to convert the G-force values sensed by the transducers 40 and 42 to digital quantities proportional to the G-forces encountered and to provide the digital quantities to the microprocessor 22. Before describing the design and construction of the data acquisition unit, consideration will next be given to the mechanical construction of the novel G-force transducers 40 and 42 used therewith. In this regard, reference is made to FIG. 3.

Figure 3:
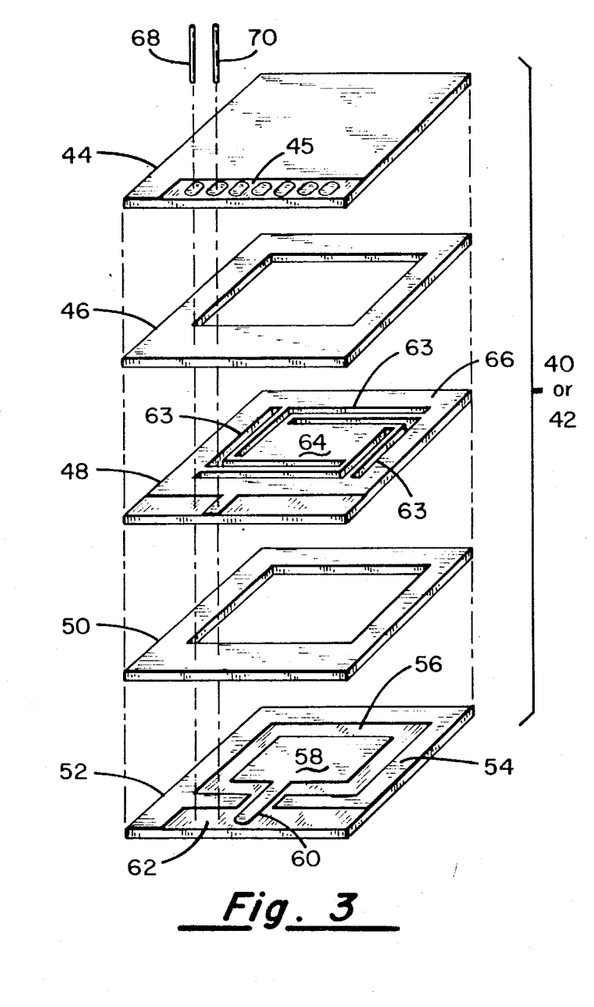
FIG. 3 is a blown-apart view of the capacitive accelerometer portion of the system of FIG. 2.

As can be seen from FIG. 3, the transducer is fabricated using well-known printed circuit etching techniques. More particularly, it comprises a laminated configuration of five layers 44, 46, 48, 50 and 52, which are shown in exploded form in the figure. The outer exposed surfaces of the layers or substrates 44 and 52 are covered with metallization, for example, copper, and that metal layer functions as a shield against EMI noise. On the inner surface of the layers 44 and 52 is a metallized pattern corresponding quite closely to what can be seen on the substrate 52. More particularly, the metallization comprises a generally rectangular frame pattern 54 extending around the periphery of the substrate and defining an unmetallized opening 56 therein. Centrally disposed in this opening is a rectangular pattern of conductive material 58 having a conductive lead 60 leading to a terminal portion 62. The only significant difference between the pattern of metallization shown on substrate 52 and that contained on the underside of the substrate 44 is that the terminal portions of each 60 are offset from one another rather than being vertically aligned.

Contiguous with substrates 52 and 44 are spacer layers. More particularly, the substrates 46 and 50 each have a generally rectangular opening formed centrally therein, the opening extending completely through the substrate.

Sandwiched between spacer layers 46 and 50 is a central substrate 48 having an etched copper layer supported by spring elements defined by a pattern of slits extending through the thickness dimension of layer 48 and surrounding a solid central segment 64. Because of the manner in which the slits 63 are postioned, the central mass 64 is effectively supported by the surrounding framework 66 by narrow strips which function as leaf springs supporting the mass 64. When the various substrates illustrated in FIG. 3 are laminated one to the other, the mass 64 and the associated leaf spring members are centrally disposed within the openings formed in the adjacent frame members 46 and 50 and, thus, the mass 64 is free to deflect relative to the conductive plates 58 formed on the substrates 44 and 52. A series of pins, such as pins 68 and 70, are passed through drilled and plated through holes formed on the appropriate substrates 44–52 in a zone aligned with zone 45 in FIG. 3 to establish selective electrical connections between the various internal layers and the exterior of the laminated construction where cable connections can readily be made to a connector block such as shown in FIG. 2.

With continued reference to FIG. 2, it can be seen that two such transducer devices of FIG. 3 are used in the performance analyzer of the present invention. A first such capacitive transducer 40 is mounted within the housing 12 and extends generally perpendicular to the top and bottom surfaces of the housing. The second transducer 42 extends parallel to the top and bottom of the housing and the two transducers are joined, via an electrical connector block 72 cooperating with the pins 68, 70, etc. to interconnect the movable plate 64 and the stationary plates 58 of substrates 52 and 44 in appropriate electrical manner to the data acquisition unit 38, via the cable 74.

The transducers 40 and 42 function as two variable capacitors connected in series forming a capacitive voltage divider. More particularly, in that the central plate 64 of the substrate 48 is displaceable under gravitational or acceleration forces, the plate portion 64 moves closer toward or further away from one or the other of the fixed plates 58 formed on the unexposed surfaces of the substrate 44 and 52.

Figure 4:
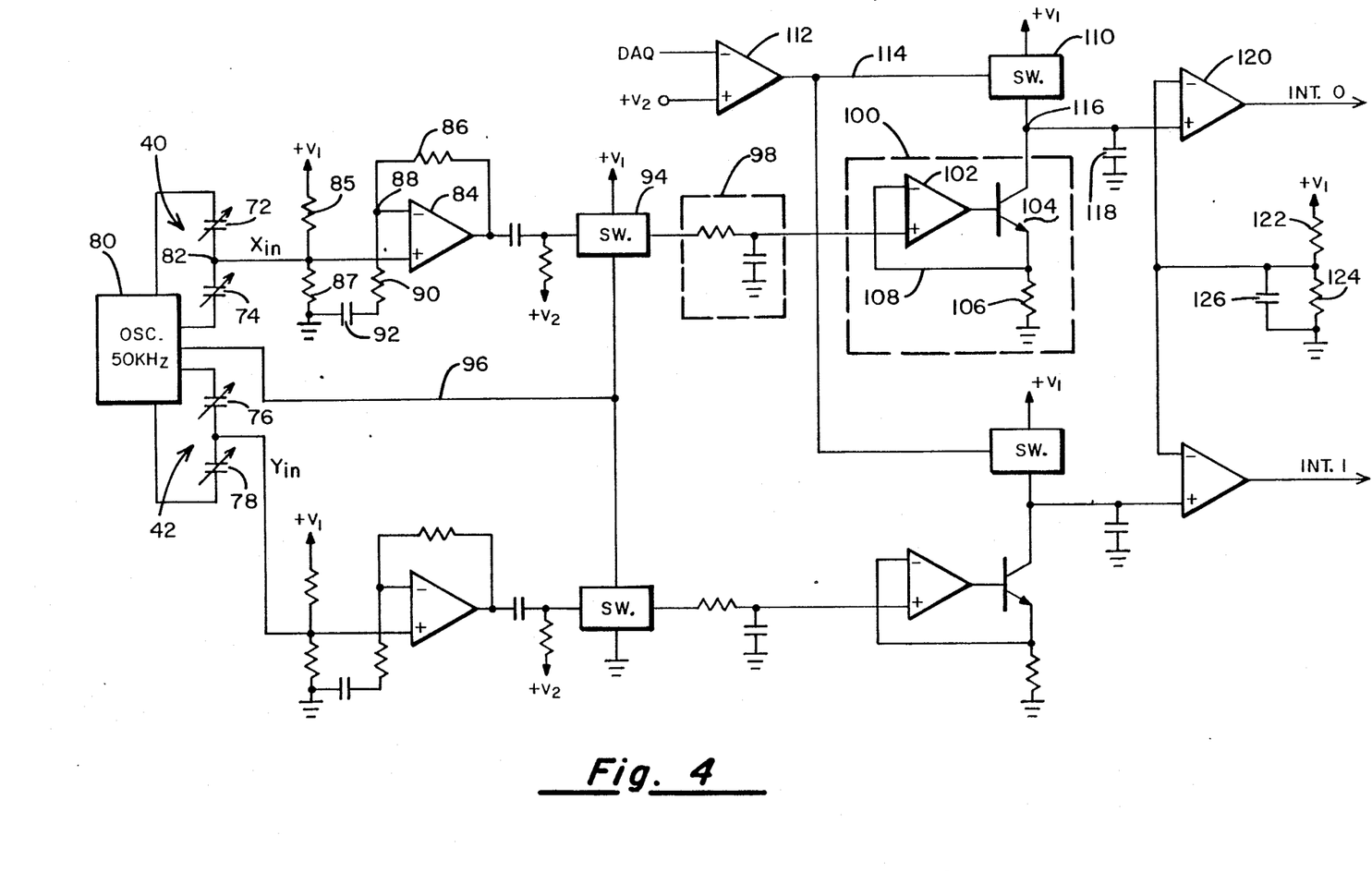
FIG. 4 is a circuit diagram of the data acquisition module of FIG. 2.

Referring next to FIG. 4, the construction and operation of the data acquisition module will next be explained.

The transducers 40 and 42 are represented in FIG. 4 by two pairs of serially connected capacitors. Assuming that it is transducer 40 that is oriented vertically within the housing 12, it senses the horizontal of X direction force component of acceleration. Similarly, the transducer 42, being mounted in a horizontal plane, is arranged to measure acceleration forces in the vertical and "Y" direction. The transducer 40 is represented in FIG. 4 by the variable capacitors 72 and 74, while transducer 42 is represented by the serially connected variable capacitors 76 and 78. The transducers are excited by the outputs from an oscillator 80, which may, for explanatory purposes, be a 50 kilohertz alternating current signal. The voltage appearing at the junction point 82 between the variable capacitors 72 and 74 is, in turn, connected directly to the non-inverting input of an operational amplifier 84 whose bias is established by the voltage divider consisting of resistors 85 and 87, which are serially joined between a source of positive potential $V_1$ and a point of fixed potential (ground).

Associated with the operation amplifier 84 is a feedback resistor 86 connected from the amplifier's output to its inverting input 88. The Ohmic value of this resistor is selected to provide a desired gain characteristic to the amplifier. The inverting input 88 is also connected through a series combination of a resistor 90 and a capacitor 92 to ground.

The output from the amplifier 84 is capacitively coupled to one of four bilateral switches of a Type 4066 IC chip 94, which is configured to function as a synchronous demodulator to effectively remove the carrier frequency generated by the oscillator 80 from the modulating envelope resulting from the application G-forces to the transducers 40 and 42. The on-off state of the bilateral switch 94 is controlled by the signal emanating from the oscillator 80 on control line 96.

The output signal from the quad-bilateral switch 94 is applied through a low pass filter 98 to the non-inverting input of a voltage-controlled current source shown enclosed by dash line box 100. The voltage-controlled current source is seen to include an operational amplifier 102 driving a NPN transistor 104. The emitter of transistor 104 is coupled through a resistor 106 to ground and the junction point between the emitter electrode and resistor 106 is connected by a conductor 108 to the inverting input of the operational amplifier 102. A second stage of the Type 4066 quad-bilateral switch is identified by numeral 110 and is controlled by an output from buffer circuit 112, via conductor 114. When the switch 110 is "on", the voltage source $V_1$ is effectively connected to the collected junction 116 of the NPN transistor 104. The buffer 112 is driven by a control signal referred to as DAQ arriving from the microprocessor 22 (FIG. 2).

A precision timing capacitor 118 is controlled between the junction point 116 and ground and the junction 116 is also connected to the non-inverting input of a voltage comparator circuit 120 which, in the preferred embodiment, may comprise a Type LM 339 linear integrated circuit. As such, the voltage appearing across the capacitor 118 is continuously compared to a reference derived from the power supply source $V_1$ by way of a voltage divider including the resistors 122 and 124. A capacitor 126 is connected directly in parallel with the resistor 124.

It can be observed that the Y-channel of the circuit of FIG. 4 is substantially identical to the X-channel previously described and, as will be explained in greater detail below, functions in exactly the same manner as the X-channel, except with respect to the signals derived from the Y-direction transducer 42.

OPERATION—FIG. 4

The operation of the data acquisition module is as follows. When the deflectable plate of the transducer comparator 40 moves under the influence of acceleration forces, the output signal from the oscillator 80 connected across the transducer causes the signal $X_{in}$ appearing at junction point 82 to be modulated. More particularly, if the displacable plate of the transducer is exactly centered because no acceleration forces are applied, the capacitance on both sides of the center tap 82 should be equal and the signal $X_{in}$ should be a steady signal equal to one-half $V_1$, assuming that the resistors 85 and 87 are of equal value. In the event that there is a deflection force applied to the movable plate of the transducer, an A.C. signal will be presented to the non-inverting input of amplifier 84 with the excursion being on one side or the other of the zero acceleration reference level, depending upon whether it is an acceleration or a deceleration force being encounterd. This A.C. signal, $X_{in}$, is amplified by amplifier 84, which also functions to perform an impedance match with the downstream circuitry. The amplifier 84 is preferably a Type TL074 and, as such, provides a very high slew rate which allows it to respond well to the 50 KHZ signal coming from the oscillator 80.

The amplified A.C. signal appearing at the output of amplifier 84 is applied as an input to the analog switch 94 which is driven by the oscillator 80 and which functions as a synchronous demodulator. As such, the signal appearing at the output of the low pass filter 98 is a D.C. signal which is proportional to the level and phase of the applied A.C. signal and will be greater than a predetermined voltage reference when the transducer is experiencing G-forces, equal to the predetermined voltage when the transducer is experiencing 0 G-forces and will be less than the predetermined threshold for negative G-forces.

The bilateral switch 110 is normally held conducting and, as such, the precision timing capacitor 118 is charged to the voltage $V_1$. When the microprocessor 22 (FIG. 2) wants to sample the G-force signal, it issues the DAQ signal, which is buffered through amplifier 112 and which operates the semiconductor switch 110 to disconnect the source $B_1$ from the timing capacitor 118. The timing capacitor thus begins to discharge through the transistor 104 and the resistor 106 to ground. The time required for the capacitor 118 to discharge is thus a function of the degree of the conductivity the transistor 104, which, in turn, depends upon the magnitude of the D.C. voltge applied to the non-inverting input of the operational amplifier 102. As already mentioned, that D.C. signal is proportional to the G-forces experienced by the transducers.

As the voltage across the timing capacitor 118 falls during its discharge through the voltage controlled current source 100, a point is reached where that voltage falls below a predetermined reference applied to the inverting input of the comparator circuit 120. At the instant that the voltage across the timing capacitor becomes equal to the reference, the comparator 120 outputs an interrupt signal (INT 0) which is fed back to the microprocessor 22. Contained within the microprocessor is a crystal-controlled clock and a counter for accumulating clock pulses therein. The counter is cleared at the instant that the DAQ signal is generated and it begins accumulating clock pulses until the INT 0 signal is received. The resulting count value is thus inversely proportional to the acceleration or deceleration forces experienced by the transducer 40. The microprocessor is programmed to perform a series of mathematical computations on the digital quantity whereby speed and distance parameters may be computed.

While an explanation has been given of the X-channel portion of the data acquisition circuit of FIG. 4, that description is equally applicable to the Y-channel in that it, too, is configured in the same manner and operates in the same way as the circuitry comprising the X-channel. By providing two such channels, the system of the present invention can compensate for variations in G-forces being sensed due to factors other than the performance of the vehicle. For example, in the case of an automobile, by knowing the vertical and horizontal components of the G-forces derived from the transducers associated with the X and Y-channels, respectively, it is possible for the microprocessor to take into account the fact that the front end of the vehicle may tilt upward or downward during high acceleration and deceleration, respectively.

Figure 5:
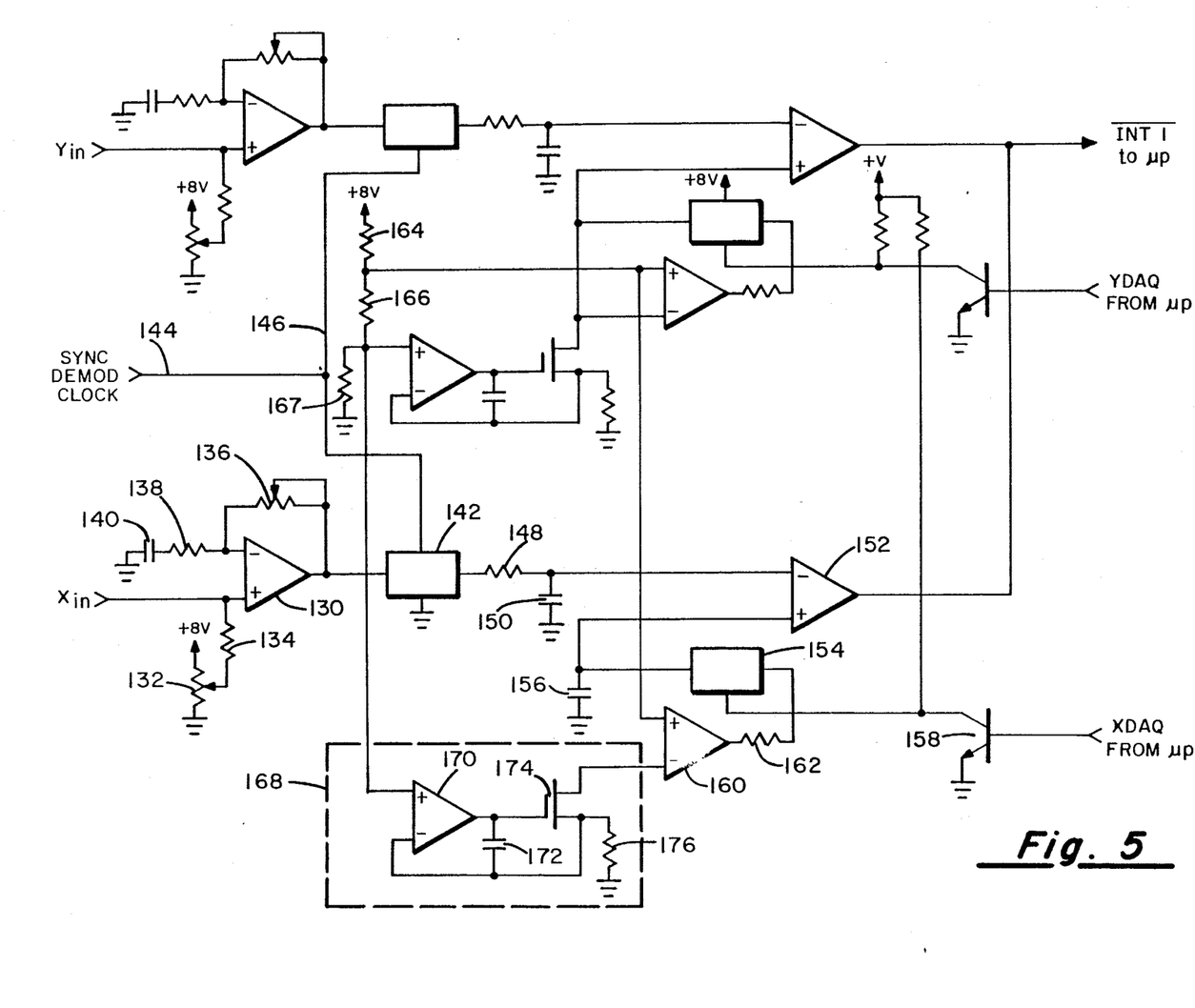
FIG. 5 is an alternative embodiment of the data acquisition module of FIG. 2.

ALTERNATE EMBODIMENT—FIG. 5

In the embodiment of the data acquisition module of FIG. 4, the pulse width defined by the occurrence of the DAQ signal and the generation of the INT signal is inversely proportional to the acceleration forces being sensed by the transducer elements. In the embodiment of FIG. 5, however, the corresponding pulse width is directly proportional to these acceleration forces. Again, because the data acquisition circuit is basically a two-channel device, one channel for the X direction transducer and another channel for the Y axis transducer, and because both channels are substantially identical, it is deemed necessary only to discuss the construction and mode of operation of one such channel, it being understood that the other channel works in substantially the same fashion.

The pulse-type output signal from the X transducer ($X_{in}$) is applied to the non-inverting input of an operational amplifier 130. This input is normally held at a predetermined DC level via the source of reference potential ($+8^v$), the adjustable resistor 132 and the fixed resistor 134. The output from the operational amplifier 130 is coupled back through a variable resistor 136 to the inverting input of that amplifier. A series combination of a resistor 138 and a capacitor 140 connects the inverting input to a point of fixed potential (ground).

The output from the operational amplifier 130 is also applied as an input to a semiconductor switching device 142 which may be one-fourth of a type 4066 quad bilateral switch. This switch is adapted to be driven by the sync demod clock via conductors 144 and 146. The output of the switch 142 is coupled through a low-pass filter consisting of a resistor 148 and a capacitor 150 to the inverting input of an operational amplifier 152 configured as a comparator.

The other input to the comparator 152 comes from the output of a semiconductor switching device 154 which preferably comprises another one-fourth of the Type 4066 quad bilateral switch integrated circuit. A capacitor 156 is coupled between the noninverting input to the comparator 152 and ground. The on/off state of the semiconductor switching device 154 is controlled by the output appearing at the collector electrode of a NPN transistor 158, whose emitter electrode is tied to ground and whose base is adapted to receive a data acquisition signal from the microprocessor (XDAQ).

The input to the quad bilateral semiconductor switch 154 comes from the output from an operational amplifier 160 by way of a resistor 162. The noninverting input to the operational amplifier 160 is held at a predetermined bias value established by a voltage source ($+8$ V) and a voltage divider including series coupled resistors 164 and 166. The inverting input of the operational amplifier 160 receives its input from a constant current source which is shown as being enclosed by a broken line box 168. This constant current source includes a further OpAmp 170 whose noninverting input is held at a predetermined bias potential via the resistive voltage divider which includes resistors 164, 166 and 167. The OpAmp 170 has a capacitor 172 connected as a feedback element from the output thereof to the inverting input. The output of the OpAmp 170 also drives an enhancement mode FET 174. The source electrode of the FET is coupled through a resistor 176 to ground while the drain electrode is connected to the inverting input of the operational amplifier 160.

Having described the components employed and their interconnection in implementing the data acquisition stage of the alternative embodiment, consideration will next be given to its mode of operation. The data acquisition circuit of the alternative embodiment has been rearranged so that the length of time between the occurrence of the XDAQ signal going high and the time that the $\overline{INT}$ signal applied to the microprocessor goes low is directly proportional to the G-force experienced by the sensor. In operation, then, the signal $X_{in}$ from the X axis accelerometer transducer is applied to the amplifier 130. As in the first embodiment, this amplifier 130 acts as a buffer/impedance converter to properly match the transducer signal to the circuitry comprising the data acquisition unit. The signal appearing at the output of the amplifier 130, then, is still a square wave at the clock frequency and is synchronously demodulated by the analog switch 142. The resulting signal is low pass filtered by the combination of the series resistor 148 and the shunt capacitor 150 which results in a dc signal at the inverting input of the comparator 152 that is directly proportional to the G-force being monitored.

Before the microprocessor initiates the XDAQ, the capacitor 156 is held to a reference value by the analog switch 154. The operational amplifier 160 and the resistor 162 are provided to ensure that the internal resistance of the analag switch 154 will not deleteriously affect the accuracy to which the voltage applied to the capacitor 156 is held. When the microprocessor switches the XDAQ signal high, the analog switch 154 is released and the capacitor 156 begins to discharge in a straight line through the constant current source enclosed by broken line box 168. As the voltage across capacitor 156 decays linearly, a point is reached where that voltage reaches the level established at the non-inverting input to the comparator 152 and the comparator produces an output $\overline{INT\,1}$. The overall result is the establishment of a pulse width whose leading edge is produced simultaneously with the XDAQ signal from the microprocessor and whose trailing edge occurs with the generation of the $\overline{INT\,1}$ signal and the interval inbetween being directly proportional to the G-force sensed by the capacitive transducer.

The circuitry implementing the channel for receiving the $Y_{in}$ is identical to the channel just described responsive to the input $X_{in}$ and, hence, it is believed unnecessary to set out in great detail the various constructional and operational features of the $Y_{in}$ channel. Suffice it to say, the channel functions to produce a pulse whose interval is directly proportional to the G-forces being sensed by the Y channel capacitive transducer.

This invention has been described herein in considerable detail in order to comply with the Patent Statutes and to provide those skilled in the art with the information needed to apply the novel principles and to construct and use such specialized components as are required. However, it is to be understood that the invention can be be carried out by specifically different equipment and devices, and that various modifications, both as to equipment details and operating procedures, can be accomplished without departing from the scope of the invention itself.

What is claimed is:

1. A vehicle performance analyzer, comprising:
   (a) electrical transducer means for sensing acceleration and deceleration forces and producing electrical signals proportional to said forces;
   (b) pulse producing means coupled to said transducer means for converting said electrical signals into a pulse whose width is proportional to said acceleration and deceleration forces;
   (c) microprocessor means, including counting means, coupled in controlling relation to said pulse producing means for converting the pulse from said pulse producing means into a digital quantity;
   (d) manually operable switch means coupled to said microprocessor means for entering commands into said microprocessor means for directing the nature of the computations to be performed using said digital quantity as an operand; and
   (e) display means for visually indicating results of said computations.

2. A vehicle performance analyzer, comprising:
   (a) an electrical transducer means including a first stationary metallic member and a second metallic plate supported in parallel, spaced relation relative to said stationary plate for movement toward and away from said stationary plate when subject to acceleration and deceleration forces having a component in a direction normal to the plane of said plate for producing electrical signals proportional to said forces;
   (b) pulse producing means coupled to said transducer means for converting said electrical signals into a pulse whose width is proportional to said acceleration and deceleration forces;
   (c) microprocessor means, including counting means, coupled in controlling relation to said pulse producing means for converting the pulse from said pulse producing means into a digital quantity;
   (d) manually operable switch means coupled to said microprocessor means for entering commands into said microprocessor means for directing the nature of the computations to be performed using said digital quantity as an operand; and
   (e) display means for visually indicating results of said computations.

3. The performance analyzer as in claim 2 wherein said transducer means includes a first planar substrate having a pattern of metallization on each major surface thereof; a second planar metallic substrate having a pattern of slits extending therethrough for flexibly supporting a generally planar mass segment; a third planar substrate having a pattern of metallization of each major surface thereof; and fourth and fifth planar substrates, each having a central opening therethrough, the opening being larger than the size of said mass segment, said first, second, third, fourth and fifth substrates being laminated in stacked relation with said fourth and fifth planar substrates being disposed on opposite sides of said second substrate.

4. A performance as in claim 2 and further including an oscillator for applying an alternating current carrier signal between said stationary plate and said movable plate, said alternating current carrier signal being amplitude modulated by movement of said movable plate.

5. A performance analyzer as in claim 4 and further including a synchronous demodulator coupled to said oscillator and operative to receive said amplitude modulated alternating current signal for producing a direct current voltage in accordance with the modulation envelope.

6. The performance analyzer as in claim 5 wherein said pulse producing means comprises: a timing capacitor; a source of reference voltage; semiconductor switching means for selectively coupling said source of reference voltage to said timing capacitor; a precision current source connected to receive said direct current voltage produced by said synchronous demodulator as a controlling signal and connected in circuit with said timing capacitor whereby the discharge time of said timing capacitor is varied in accordance with said controlling signal.

7. The performanc analyzer as in claim 6 wherein said microprocessor means control the on/off state of said semiconductor switching means.

8. The performance analyzer as in claim 7 and further including comparator means coupled to said timing capacitor for producing an output signal when the voltage on said timing capacitor drops below a predetermined threshold; and means for supplying said output signal from said comparator means to said microprocessor.

* * * * *